April 23, 1968     J. GALLO, SR     3,379,231
FASTENER HOLDER AND DRIVER
Filed Nov. 29, 1966     2 Sheets-Sheet 2
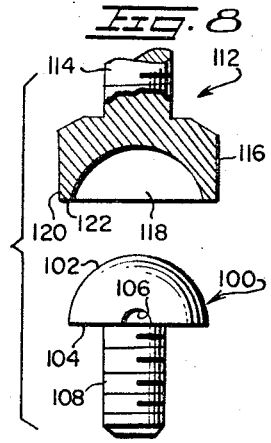
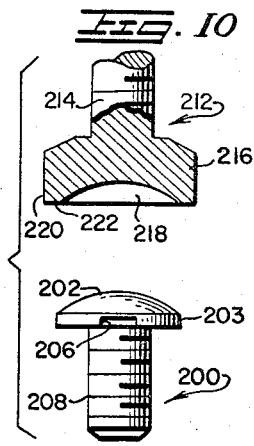
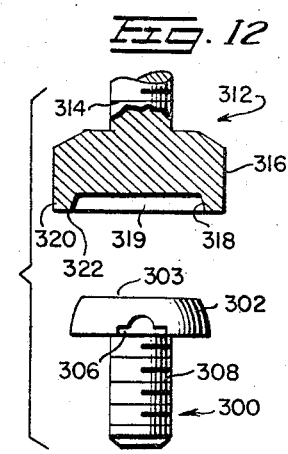
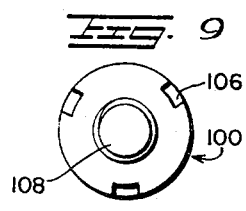
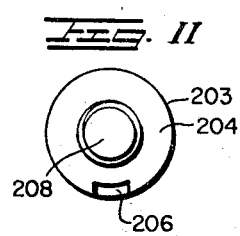
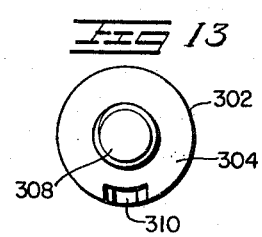
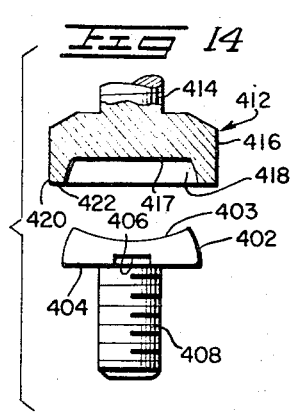
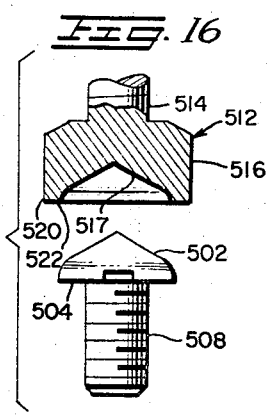
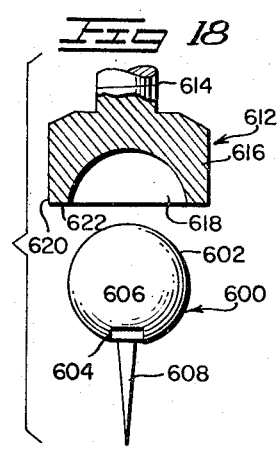
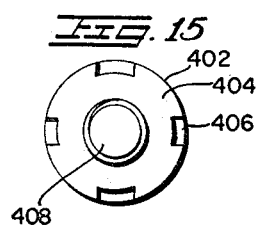
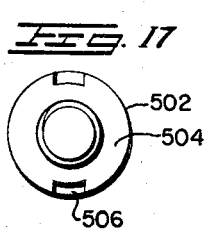
INVENTOR
JOHN GALLO, SR.
BY *Kimmel, Crowell & Weaver*
ATTORNEYS.

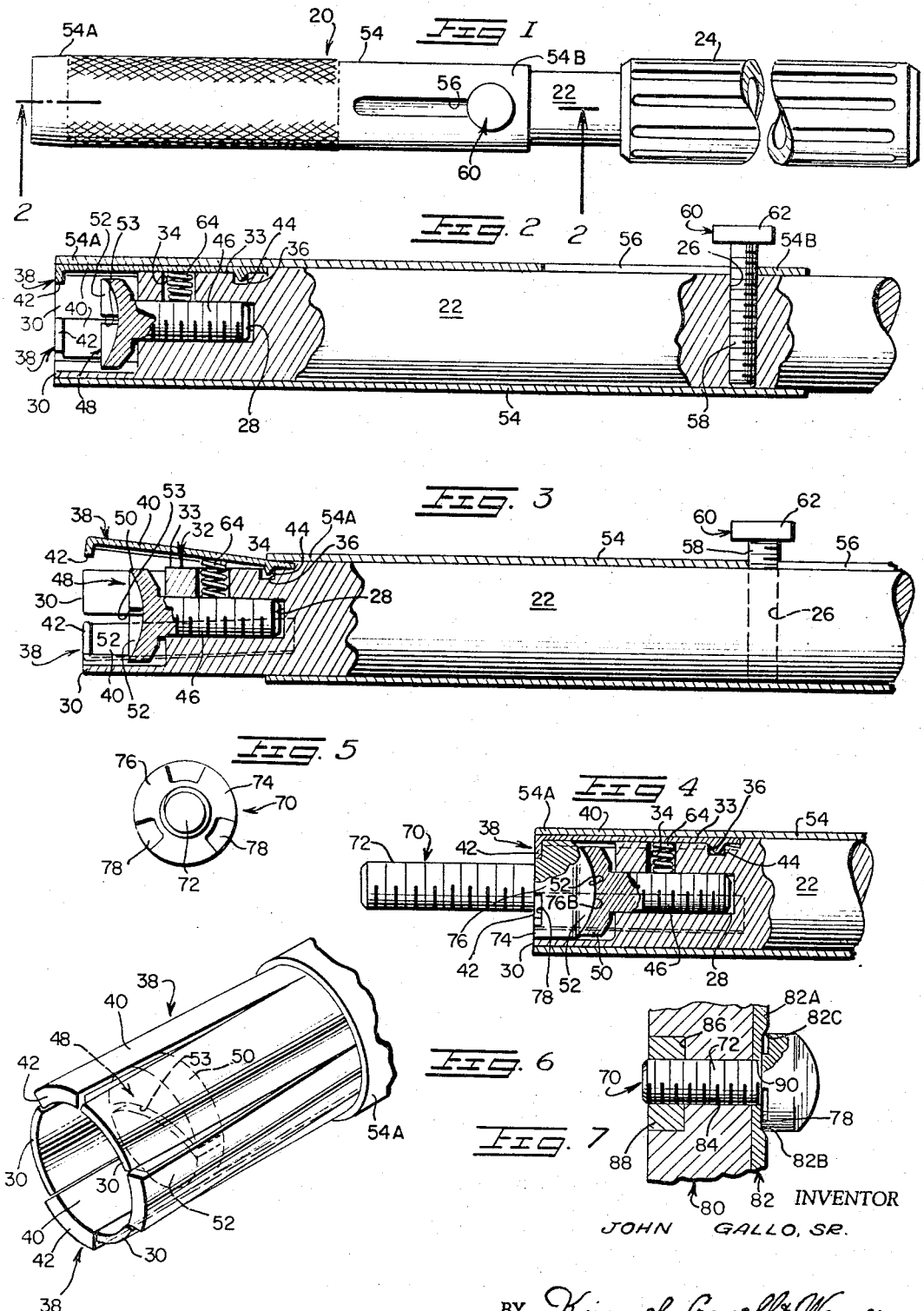

United States Patent Office 3,379,231
Patented Apr. 23, 1968

3,379,231
FASTENER HOLDER AND DRIVER
John Gallo, Sr., 64 Broad St., Boston, Mass. 02157
Filed Nov. 29, 1966, Ser. No. 597,718
8 Claims. (Cl. 145—52)

This invention relates to the provision of fastening means and a manually operated driver for driving and setting the same and, more specifically, the present invention pertains to the provision of headed fastener means of the wood, machine screw and pin types together with means affording connection with driver means and wherein the connecting means on the fastener means become substantially concealed from view when the fastening means have been set and the driver means disconnected therefrom.

While the utility of the fastener means and the driving means for driving and setting the fastener means, all concerned in the present application, find application to wide and varied fields of endeavor, one of the primary objects of this invention is to provide headed push type nails and pins as well as headed wood and machine type screws wherein the fastening devices serve both functional and ornamental purposes. To this end, the fastening means according to this invention, find widespread industrial applications as well as having utility in homes, offices and specialty shops wherein free license is given to original ornamentation and design.

Further, and still with specific reference to the fastener devices or means, the present invention envisions, as another major object thereof, the provision of headed fasteners wherein the design of the head is, for all practical purposes, limited only by the scope of the imagination of the designer and, of significant importance, wherein the fastener devices may be made cold-headed.

Of no less importance than the preceding objects is the still further object of this invention which resides in the provision of driver means for the aforementioned fastener means wherein the driver mechanism is provided with quickly operable releasable securing means whereby a fastener may be easily and quickly connected with the driver device, driven and set thereby, and after setting, the securing means is operable to quickly effect the release of the driving means from the fastener without disturbing the latter.

In the carrying out of the above objects, it becomes yet another object of this invention to provide the heads of the headed fastener devices with one or more peripherally located indentations to cooperate with means on a manually operated tool (such as is disclosed herein) to secure the fastener thereon for the subsequent driving of the fastener thereby.

Additionally, it is a further object of this invention to arrange the indent or indentations formed in the underside of the head of the fastener device so as to extend inwardly from the outer peripheral marginal edge of the head whereby the same are concealed or rendered substantially invisible as the head of the fastening device is viewed from the outer end thereof, this permitting the user to demonstrate his highest degree of professional skill in effecting designs of high grade quality. It should also be noted that in so positioning the indents of the fastening means, the fastening means are rendered practically tamper-proof, this feature comprising still another object of this invention.

The disposition of the indents at the underside of the head of the fastener and adjacent its peripheral marginal edge permits the operator of the driving means therefor to exercise less effort while obtaining a greater torque when driving screw type fasteners, and in driving nail or pin type fasteners the driver jaws exercise a maximum grip on the fastening devices preventing the latter from twisting or otherwise going out of control as the same are being set.

In accordance with a further object of this invention, it is proposed to provide a driving tool to cooperate with the fastener means to which reference was generally made immediately above and wherein the tool includes longitudinally extending handle means to which is connected one or more jaws complementing, in number, the number of indentations formed on the heads of the fastening means, and wherein the jaws are movable toward and away from the longitudinal axis of the handle to effect their connection and disconnection with a selected one of the fastening devices.

It is a still further object of this invention to provide, in the above described driving tool, fastener head seat means which cooperate with the jaw mechanism to hold the fasteners securely against movement relative to the driving means by clamping the head thereof against the jaw means, and wherein the driving tool and the fastening means cooperate to prevent the fastener from being driven to a point beyond its normal set position to the ultimate damage of the goods or material on which work is being performed.

It is a further object of this invention to provide the tool head seat means with a configuration complementing the exterior configuration of the head of the fastening means thereby eliminating or reducing to a minimum the possibility of marring the ornamental finish as applied to the head of the fastener or the deformation of the material of which a head is formed should there be inadvertent or accidental turning movement of the head seat relative to the head of the fastener as the tool is being operated.

The above noted objects of this invention serve to but summarize a few of the more outstanding features attributable thereto and which serve to distinguish it from prior art practices, but as such, these objects and advantages of this invention are not to be considered as exhaustive or to comprise any limitation on the invention as, for example, this invention also contemplates, as still another object thereof, the provision of fastening devices and driving means therefor, all of which are non-complex in construction, inexpensive to manufacture, and which are durable in use.

Other and further objects and advantages of the instant invention will become more manifest from a consideration of the following specification when read in conjunction with the annexed drawings, in which:

FIGURE 1 is a top plan view of a fastener driver device constructed in accordance with this invention, FIGURE 1 showing the relative positions of certain components of the device when disposed in their respective operative positions;

FIGURE 2 is an enlarged fragmentary detail cross-sectional view, partly broken away to show working components of the driver device, FIGURE 2 being taken substantially on the plane of line 2—2 of FIGURE 1, looking in the direction of the arrows;

FIGURE 3 is an enlarged fragmentary detail cross-sectional view, similar to FIGURE 2, FIGURE 3 illustrating the relative positions of certain component elements of the driver device when moved to their respective inoperative positions;

FIGURE 4 is an enlarged fragmentary detail cross-sectional view similar to FIGURE 2, FIGURE 4 showing the relative positions of certain of the driver device elements in operative association with a headed fastening means constructed according to this invention;

FIGURE 5 is an end elevational view of the fastening means shown in FIGURE 4, FIGURE 5 showing indentations formed in the underside of the head of the fastener means, located adjacent the peripheral marginal edge thereof;

FIGURE 6 is a fragmentary exploded perspective view of the clamping jaw assembly and associated components as readied to receive a fastening means therein;

FIGURE 7 is a fragmentary detail cross-sectional view of fastener means constructed according to this invention as applied to work;

FIGURES 8, 10, 12, 14, 16 and 18 show, in combination, a fragmentary portion of the head seat means partially broken away to show the concave cavity thereof, and in side elevation showing a fastening means having a head complementing the cavity of the associated head seat means; and FIGURES 9, 11, 13, 15, 17 and 19 being end elevational views of the fastening means shown in FIGURES 7, 9, 11, 13, 15 and 17, respectively, these end elevational views showing the indentations formed in the underside of the fastener heads.

Referring now more specifically to the drawings, reference numeral 20 designates, in general, a manually operable fastener holding and driver device or mechanism constructed in accordance with the teachings of this invention, and for subsequent convenience of reference purposes, the mechanism 20 will be hereinafter referred to as the "driver device."

The driver device 20 is seen to comprise an elongated solid cylindrical main body portion 22 having one end of an elongated conventional handle grip 24 fixedly secured to an end thereof by means well known in the art. To serve a function to be described, the main body portion 22 is provided, intermediate its ends, with a diametrically extending tapped opening 26 (see FIGURES 2 and 3).

The other end of the main body portion 22 is formed with an axially extending internally threaded bore 28, and projecting longitudinally from this end of the main body portion 22 and integrally connected herewith are a plurality of circumferentially fixed concave-convex guide sleeve segments 30 of identical configuration, the concave sides of the sleeve segments facing inwardly toward one another.

Extending inwardly from the outer terminus of the aforementioned other end of the main body portion 22 are a plurality of relatively shallow elongated and axially extending grooves 32 each having a convex outer side or surface 33, the grooves being circumferentially spaced about the main body portion 22, and each groove is disposed intermediate a pair of adjacent ones of the sleeve segments 30 and has a depth substantially equal to the thickness of any one of the sleeves.

The main body portion 22, adjacent the above referred to other end thereof, is also provided with a plurality of radially extending circumferentially spaced pockets 34 corresponding in number to the number of grooves 32, the pockets 34 opening at one of their respective ends into its associated groove, and at its other end the pockets open into the bore 28. Spaced inwardly from said other end of the main body portion 22 and a greater distance than the pockets 34, are a plurality of circumferentially spaced radially extending sockets 36, there being one socket 36 for each pocket 34, and each pair of sockets 36 and pockets 34 is axially aligned relative to the longitudinal axis of the main body portion 22, and the sockets 36 as one of their respective ends is seen to open into their respective associated groove 32.

Reference numerals 38 each denote an elongated substantially L-shaped clamping jaw each of which includes an elongated concave-convex leg portion 40 integrally connected at one of its ends with the inner end of the laterally extending foot section 42 which, in the embodiment of FIGURES 1 to 6, inclusive, has a substantially truncated sector-shaped configuration. The clamping jaws 38 are each formed of a substantially rigid material, and each of the leg portions 40 thereof adjacent its free end is formed with a stop lug 44 that projects laterally from the concave side thereof. The number of jaws 38 correspond in number to the number of grooves 32 and each jaw 38 is disposed within, respectively, one of the grooves 32 with the concave side of the jaw 38 normally engaging in surface-to-surface contact with the adjacent convex side of its associated groove. The leg portion 40 is of such length as to span the adjacent open ends of each pair of pockets and sockets, 34, 36, respectively, associated with each of the grooves 32, and with the free end of each leg portion 40 extending substantially to the inner end of its associated groove. The other ends of the leg portions 40 extend beyond the other end of the main body portion 22 and terminate in a plane common to the ends of the sleeve segments 30.

Threaded into the bore 28 is the threaded shank 46 of fastener head seat means generally indicated by reference numeral 48. Integral with the outer end of the shank 46 is an enlarged substantially cylindrical head 50 which, in the embodiment of this invention illustrated in FIGURES 1 to 6, inclusive, has an outwardly facing substantially concave cavity or seat 52. As is seen in FIGURES 2, 3 and 4, a radius of the head 50 is less than the inner radius of the sleeve segments 30 to provide appreciable clearance between the two elements, and the concave seat 52 of the head 50 is formed with a diametrically extending slot 53 which is adapted to releasably receive the blade (not shown) of a tool such as a screwdriver, for example, in order to adjust the seat means 48 axially of the main body portion 22 and to thereby change the axial distance between the concave side or cavity 52 and the foot sections 42 of the clamp jaws 38 to serve a function to be described infra.

An elongated substantially hollow cylindrical axially extending collar 54 is telescoped over the main body portion 22 and is reciprocable thereon. As is seen in FIGURES 1 to 3, inclusive, the collar 54 is reciprocable between the handle grip 24 and the aforementioned other end of the main body portion 22, and is of such length as to have an outer end portion 54A superimposed on the sleeve segments 30 and the clamping jaws 38 when it is moved to its remote position in a direction away from the handle grip 24 (see FIGURES 1 and 2), disposing the collar 54 in its operative position.

To limit the reciprocable movement of the collar 54 an elongated axially extending slot 56 is formed in the inner or other end 54B thereof, the slot 56 receiving an elongated threaded shank 58 of a screw 60 therethrough, the screw having an enlarged head 62 at the outer end thereof for ease of manual manipulation. The threaded shank 58 is threadedly received within the opening 26, and from FIGURE 2 of the drawings it is seen that the collar 54 is prevented from inadvertent or accidental displacement over the said other end of the main body portion 22 by the engagement of the outer end of the sidewall of the slot 56 with the shank 58.

Interposed between each of the leg portions 40 and the shank 46 is a helicoidal spring 64, each spring 64 being under compression and constantly biases its associated jaw means 38 for movement from its operative position superimposed on the said other end of the main body portion 22 to its open inoperative position shown in FIGURE 3. In this last named figure, the collar 54 has been moved axially inwardly of the main body portion 22 to the extent that the outer terminal end of the end 54A has moved to a position substantially over the lugs 44 or slightly therebeyond whereby the outer free ends of the clamping jaws 38 are permitted to swing radially and outwardly from one another as shown, and under the force exerted by the springs 64, and the end 54A of collar 54 is prevented from overriding the free ends of the leg portions 40 by the engagement of the other end of the side wall of the slot 56 with the opposite side of the shank 58. If for any reason one or more of the jaws 38 are influenced to shift longitudinally in a direction away from the aforementioned other end of the main body portion 22, and while the lugs 44 are loosely engaged within their associated sockets 36, still they are of such size as to engage and abut an adjacent side of their respective associated sockets 36 thereby effectively restraining the jaws 38 against such movement under conditions which may tend to effect this relative movement.

The details of the construction of the driver device 20 having been set forth above, it now becomes necessary to detail the construction of the fastening means used in association therewith, and hereinafter referred to as a "fastener." The fastener shown in FIGURES 5 and 6 of the drawings is generally designated by reference numeral 70, and in this particular case, the fastener 70 is shown as comprising a machine screw. It will be understood, however, that insofar as this invention is concerned, the fastener 70 could have been just as well shown as a wood screw or having a shank of other configuration without in the least affecting this inventive concept provided that the fastener employed meets with but one condition, namely, it must be provided with a minimum of one indentation, slot or opening at a side thereof. Through preference, and without in any manner intending to limit the scope of this invention, and in order to demonstrate the versatility of the invention in the background as provided by the objects, supra, the fasteners disclosed herein are provided with enlarged heads, which could be cold formed, and wherein the heads are ornamental in order to enable the user thereof to execute design handicraft.

Thus, and in FIGURES 5 and 6, the fastener 70 is seen to include an elongated threaded shank 72 integrally connected at one of its ends centrally with respect to the underside 74 of an enlarged head 76 having an axially elongated solid cylindrical main body portion 76A. The latter terminates in a convex end 76B which is struck on substantially the same radius as is the concave side 52. The underside 74 of the head 76 is provided with a plurality of radially extending indentations or grooves 78 which, at their respective outer ends, open into the cylindrical plane of the main body portion 76.

To utilize the driver device 20 and its complementing fastener 70, the collar 54 is shifted axially to the right as viewed in FIGURE 1, to move the collar 54 to its innermost position as shown in FIGURE 3 whereby the jaws 38 are released to move to their radially and outwardly displaced positions as shown in this last named figure. The head 76 is now slidably inserted between the sleeve segments 30 to engage the convex end 76B thereof with the concave side 52 of the fastener head seat means 48, and in this example of use, has been threaded within the bore 28 for a distance of substantially its entire length. The fastener head seat means 48 is, preferably, preadjusted to its position axially of the main body portion 22 through the use of a screwdriver or other type of similar bladed tool, as described above, so that the distance between the apex of the concave side 52 of the seat means 48 is substantially equal to the distance between the plane of the underside 74 of the fastener 70 to the apex of its convex side or end 76B. In making the insertion some care should be exercised to position the indentations or slots 78 in confronting relation to the foot sections 42 whereby upon shifting of the collar 54 axially from its position of FIGURE 3 to its position shown, for example, in FIGURES 1 and 4, the collar 54 in sliding over the jaws 58 forces them to move radially and inwardly towards one another causing the foot sections 42 to enter and lock with the indentations or slots 78, the configuration of the indentations or slots 78 complementing, of course, the shape of the foot sections 42.

The width of the indentations or slots 78 at the entrance thereto may be slightly wider than the length of the foot sections 42 to provide interlocking engagement therebetween even in the event of a small degree of misalignment, but the difference should not be such that an appreciable amount of relative rotary or turning movement takes place between the head 76 and the fastener head seat means 48 when torque is applied to the main body portion 22 via the handle grip 24 as the fastener 70 is being worked, for such relative movement, if permitted to an appreciable degree, could mar or damage the finish applied to the surface of the fastener head 76.

With the head 76 encompassed by the guide sleeve segments 30 and the leg portions 40, and firmly clamped between the fastener head seat means 48 and the adjacent confronting side of the foot sections 42 of the clamping jaws 38, all as shown in FIGURE 4, the fastener device 70 may now be worked, and to this end reference is made to FIGURE 7 of the drawings.

In FIGURE 7, reference numeral 80 denotes any substantially rigid structure to which a finish or other type of sheet 82 is to be secured in face-to-face engagement, for example. Let it here be assumed for the purpose of exemplification that the sheet 82 is formed of a flexible material such as a leather, a fabric, or of other material which will permit of a minimum of, at least, compression.

The structural member 80 is preferably preformed with a bore 84 which opens into a counterbore 86, and the latter is preferably fitted with a conventional machine nut 88. The sheet 82 is provided with a transversely extending opening 90 coaxially aligned with the bore 84 and the threaded shank 72 of the fastener 70 as held by the driver device 20 in the manner shown in FIGURE 4 is now passed through the opening 90 and the leading end of the shank 72 is then threaded into the nut 88 in the conventional manner.

As the fastener 70 is taken up by the nut 88 the underside 74 of the head 76 will eventually engage and compress the adjacent confronting outer surface 82A. When the bolt 70 has been tightened to a sufficient degree, the collar 54 is moved axially of the main body portion 22 from its position shown in FIGURES 1 and 4, returning it to its position shown in FIGURE 3 thereby releasing the clamping jaws 38 to permit them to move radially away from the main body portion 22 under the influence of their respective helicoidal springs 64, whereby the driver device 20 becomes disconnected from the fastener 70. As the fastener 70 is set, the compressed portion 82A immediately underlying the confronting underside 74 of the head 76 provides a shoulder 82B which normally tends to conceal the lower edge of the head 76, and in so concealing this peripheral margin edge the shoulder 82B tends to partially, if not completely, conceal as at 82C the entrance to each of the slots or indentations 78. The screw 70 thus becomes seated, and the seating thereof has been accomplished without in any way marring the head 76, and the means employed for connection with the driving device 20 therefore have been effectively concealed.

As has been stated above, the fastener head seat means 48 is adjustable towards and away from the foot section 42. Thus, the driver device 20 with its given fastener head seat means 48 could be used with a fastener having a head 76 of any axial length even if the cylindrical portion thereof disappears or becomes common with the plane of the base of the arcuate end.

Since this invention does contemplate the use of the driver device 20 in conjunction with fasteners whose heads may vary in configuration depending upon the design to be executed by the operator, the fastener head seat means 48 is made interchangeable with other similarly constructed fastener head seat means wherein the radius or contour of the seat 50 will complement the contour of the head of the fastener or a part thereof, and as will be shown below, it is contemplated that the driver device and the fastening means may be provided with one or more clamping jaws and indentations or slots, respectively, when the foot sections of the clamping jaws complement the configuration of the indentations of the fastener.

In FIGURES 8 to 19, inclusive, are shown fastener head seat means which are interchangeable with the fastener head seat means 48, and various fasteners with which the fastener head seat means are adapted to cooperate.

Thus, and in FIGURES 8 and 9 of the drawings, the fastener device according to this invention and shown therein is identified by reference numeral 100, and in this construction the fastener is not provided with the cylindrical portion 76 as is the fastener 70. Instead, the head or end 102 of the fastener 100 is rounded to a planar base or underside 104 in which are formed the indentations or slots 106. In this example, the indentations 106 are not only arcuately shaped with respect to their length but are also arcuately shaped with respect to their depth. While the clamping jaws 38 of the driver device 20 could be employed in setting the fastener 100, it is preferable, of course, that the same be exchanged for clamping jaws wherein the foot sections 42 will include a portion adapted to be received and complement the configuration of the slot or indentation 106. By inspection it is seen that the radius of the end 102 differs from that at 76B, and this necessarily requires a modified fastener head seat means which is here designated by reference numeral 112, the latter being exchanged for the fastener head seat means 48. The means 112 includes all of the major elements of the fastener head seat means 48 in that it is provided with a seat 116 having, as before, a concave side 118 which is struck on substantially the same radius as the radius of the end 102 of the fastener 100. Here, however, the radius of the concave side 118 is somewhat shorter so as to provide a seat 116 having a cylindrical extension 120 terminating at its outer end in a substantially planar face 122.

Since the fastener 100 of FIGURES 8 and 9 is a machine screw, it too is provided with a threaded shank 108.

In FIGURES 10 and 11 a still further modification of the invention is shown wherein the fastener, here designated by reference numeral 200, is formed with the convex end 202 having a cylindrical main body portion 203 and a threaded shank 208. The fastener 200 is very similar to the one shown in FIGURES 5, 6 and 7 wherein the same is identified by reference numeral 70, and differs therefrom essentially in the fact that the axial length of the cylindrical main body portion 203 is less than the axial length of the cylindrical main body portion 76A. Additionally, the underside 204 of the main body portion 203 also differs in the provision of but one indentation or slot 206 of the type heretofore indicated by reference numeral 78 (FIGURE 5). In using the fastener 200 it would be necessary, of course, to remove all but one of the clamping jaws 38 or, optionally, to provide the main body portion but with a single one of the guide sleeve segments 30 and but one of the jaws 38.

The fastener head seat means of the embodiment illustrated in FIGURES 10 and 11 is here denoted at 212 and is provided with the usual threaded shank 214, seat means 216, concave side 218, cylindrical extension 220 and planar face 222, as before.

It will be noted that in the embodiment of FIGURES 10 and 11, the same reference numerals have been applied to the elements thereof, finding counterparts in the preceding embodiment of FIGURES 8 and 9, except that the reference numerals have been increased by 100. In the following description of other embodiments of this invention, the same numerical intimate increase of 100 is employed from one embodiment to another, comments being offered below only wherein the mechanical differences matter materially over design changes.

Thus, and in the configuration of FIGURES 12 and 13, the end 302 is seen to comprise a truncated form of the head or end 102 to provide a planar surface 303 in the plane of the frustum, and the concave side 318 of the fastener head seat means 312 is correspondingly truncated to provide the flat planar mating surface 319. The slot 320 is modified to include the combined characteristics of the slots 106 and 206 necessitating the use of a clamping jaw 38 having a foot section modified accordingly to mate therewith.

In FIGURES 14 and 15, the design of the fastener head seat means 412 is essentially the same as that shown in FIGURE 312, but the outer surface 403 of the fastener 400 is now shown as being concave. In this embodiment of the invention, the number of indentations or slots 406 has been increased to four which necessitates, of course, a corresponding change in the number of sleeve guides 30 and foot sections 42 in the main body portion 22.

In FIGURES 16 and 17, the fastener is shown as having essentially a conical end 502 which requires a corresponding change in the mating surface or concave side 519 of the head 516. Here the slots 506 are shown as being two in number which, of course, requires a change in the design of the main body portion 22.

In FIGURES 18 and 19, the fastener head seat means 612 now requires no detailed description since it is essentially a duplicate of that shown in FIGURE 8, for example, but the fastener 600 should be remarked upon for it is shown in this embodiment as comprising a push-pin or push-nail having a spherical head or end 602. The underside of the head 602 is here denoted by reference numeral 64 and is here shown with radial slots 606 extending from its apex. Projecting laterally from the lower apex end of the head 202 is a smooth tapered shank 608.

The push-nail or pin fastener 600 is used with the driver device 20 in the same manner as described above with the exception, of course, that the device 20 is pushed rather than turned to seat the fastener 600.

Having described and illustrated this invention in detail, it will be understood that the embodiments offered herein are by way of example, and that this invention is to be limited only by the scope of the appended claims.

I claim:

1. A driver device for a work fastening means having a driver engageable head including an outer end and an underside, said device comprising an elongated main body portion having a pair of opposed ends, elongated fastener head guide sleeve means projecting longitudinally from one end of said main body portion in peripherally spaced relation, fastener head seat means disposed at said one end of said main body portion and being centrally disposed with respect to said fastener head guide means, said fastener head seat means being engageable with the outer end of said fastener means as the latter is inserted through said guide means, fastener head drive and clamp means disposed on said main body portion for movement between and away from said guide means to engage with and be disengaged from, respectively, said underside of said head of said fastener means when seated in its said seat, means constantly biasing said clamp means for movement away from said guide sleeve means, and a reciprocable collar mounted on said main body portion movable in one direction to force said clamp means between said guide sleeve means against the force of said biasing means and thereby to clamp said fastener head between said clamp and fastener head seat means.

2. A driver device as defined in claim 1 wherein each of said clamp means comprises an L-shaped jaw having a leg portion movable between said guide sleeve means, and a laterally projecting foot section at one end of said leg portion to effect releasable engagement thereof with said underside of said head whereby said head is releasably clamped between said fastener head seat means and said foot section upon movement of said collar in said one direction.

3. A driver device as defined in claim 1 wherein said guide means comprises a plurality of guide sleeve segments and said clamp means comprises a plurality of L-shaped clamping jaws each having a leg portion movably disposed between each adjacent pair of said guide sleeve segments, and each of said clamping jaws having a laterally projecting foot portion at an end of each of said leg portions, respectively, to effect releasable engagement thereof with said underside of said head whereby said head is releasably clamped between said fastener head seat means and said foot sections upon movement of said collar in said one direction, and said collar upon movement thereof in the opposite direction freeing said clamping means for movement under the influence of said biasing means in a direction away from between said guide sleeve segments and causing said foot sections to disengage from said underside of said head.

4. A driver device as defined in claim 3 and means on said fastener head seat means cooperating with means on said main body portion enabling said fastener head seat means to be axially adjusted with respect to said main body portion whereby the distance between said clamping jaw foot sections and said fastener head seat means may be adjusted in order that said device may accommodate fastener heads the actual length of each of which may vary from one to another.

5. A drive device as defined in claim 4 wherein each of said clamping jaws is removably mounted on said main body portion, and means on each of said clamping jaws cooperating with means on said main body portion to prevent axial shifting of said clamping jaws relative to said main body portion.

6. A driver device as defined in claim 5 wherein said last named means includes a lug projecting laterally from each of said clamping jaws and said main body portion includes a socket for each of said lugs, respectively, said lugs being loosely received within their respective said socket.

7. A driver device as defined in claim 6 wherein said biasing means includes a resilient element for each of said clamping jaws and said main body portion is provided with a plurality of pockets to receive one of said resilient elements, respectively, therein, said resilient elements each having an end thereon bearing against said leg portion of its immediately adjacent clamping jaw.

8. A driver device as defined in claim 7 and means on said collar cooperating with means on said main body portion to limit the reciprocable movement of said collar relative to said main body portion in each direction of its said movement.

References Cited

UNITED STATES PATENTS

| | | | |
|---|---|---|---|
| 954,073 | 4/1910 | Bender | 145—52 |
| 1,754,739 | 4/1930 | Calvert | 145—52 |
| 2,676,506 | 4/1954 | Schultz | 81—125 |

FOREIGN PATENTS

| | | |
|---|---|---|
| 578,230 | 6/1946 | Great Britain. |
| 619,794 | 3/1949 | Great Britain. |

OTHELL M. SIMPSON, *Primary Examiner.*

R. V. PARKER, *Assistant Examiner.*